(12) United States Patent
Minuth et al.

(10) Patent No.: US 8,857,455 B2
(45) Date of Patent: Oct. 14, 2014

(54) METHOD FOR REGULATING A VALVE

(75) Inventors: Stephan Minuth, Mülheim a.d. Ruhr (DE); Stefan Riemann, Kaarst (DE); Klaus Rothe, Rees (DE)

(73) Assignee: Siemens Aktiengesellschaft, Munich (DE)

( * ) Notice: Subject to any disclaimer, the term of this patent is extended or adjusted under 35 U.S.C. 154(b) by 190 days.

(21) Appl. No.: 13/578,701

(22) PCT Filed: Feb. 15, 2011

(86) PCT No.: PCT/EP2011/052185
§ 371 (c)(1),
(2), (4) Date: Aug. 13, 2012

(87) PCT Pub. No.: WO2011/098613
PCT Pub. Date: Aug. 18, 2011

(65) Prior Publication Data
US 2012/0312383 A1   Dec. 13, 2012

(30) Foreign Application Priority Data
Feb. 15, 2010   (EP) ..................................... 10001533

(51) Int. Cl.
G05D 11/00 (2006.01)
B01F 3/04 (2006.01)
F01K 13/02 (2006.01)
G05D 11/13 (2006.01)
G05D 23/13 (2006.01)
F22G 5/12 (2006.01)
F01K 7/22 (2006.01)

(52) U.S. Cl.
CPC ........ G05D 23/1386 (2013.01); G05D 23/1393 (2013.01); F22G 5/126 (2013.01); F01K 7/22 (2013.01); F01K 13/02 (2013.01)
USPC ............ 137/3; 251/129.04; 122/459; 60/653; 60/646

(58) Field of Classification Search
USPC ........................ 137/1, 2, 605, 3, 340, 599.11; 251/129.04; 122/459; 60/653, 646
See application file for complete search history.

(56) References Cited

U.S. PATENT DOCUMENTS

| | | | | |
|---|---|---|---|---|
| 3,111,936 A | * | 11/1963 | Brunner ...................... | 122/479.7 |
| 4,471,620 A | * | 9/1984 | Binstock et al. ............... | 60/653 |
| 4,576,008 A | * | 3/1986 | Silvestri, Jr. .................... | 60/662 |
| 4,703,722 A | * | 11/1987 | Fukayama .................. | 122/406.5 |
| 5,435,138 A | * | 7/1995 | Silvestri, Jr. .................... | 60/652 |

(Continued)

FOREIGN PATENT DOCUMENTS

EP       0669566 A1   8/1995
JP       58168111 A   10/1983

*Primary Examiner* — Atif Chaudry

(57) ABSTRACT

A method for regulating a steam bypass valve is provided. The bypass valve is arranged in a steam line and the steam line includes a device for spraying water. The equation, $$t_{Rest,0} = \frac{FB_{max}}{\dot{m}_{W,SOLL} - \dot{m}_{W,IST}}$$

is used to determine when to close the steam bypass valve. The steam bypass value is closed when $t_{Rest,0}$ is smaller than a value $\Delta t$. An actual volume of water $\dot{m}_{W,IST}$, a desired volume of water $\dot{m}_{W,SOLL}$ and a maximum water-volume deficiency $FB_{max}$ are used in the equation.

7 Claims, 3 Drawing Sheets

(56) References Cited

U.S. PATENT DOCUMENTS

| | | | |
|---|---|---|---|
| 5,845,496 A * | 12/1998 | Bachmann | 60/646 |
| 6,457,313 B1 * | 10/2002 | Fujii | 60/653 |
| 7,861,527 B2 * | 1/2011 | Xu | 60/653 |
| 2008/0236616 A1 * | 10/2008 | Bloch | 134/2 |
| 2009/0138128 A1 * | 5/2009 | Fusi | 700/282 |
| 2009/0211252 A1 * | 8/2009 | Tani et al. | 60/645 |

* cited by examiner

FIG 2

$$\Delta t = \ldots [s]$$
$$FB_{max} = \ldots [kg]$$

---

$$\dot{m}_{W,\,Ist} < \dot{m}_{W,\,Soll}$$
$$t_0 = 0$$
$$\dot{m}_{W,\,Soll,\,0} = \dot{m}_{W,\,Soll}$$
$$\dot{m}_{W,\,Ist,\,0} = \dot{m}_{W,\,Ist}$$
$$t_{Rest,\,0} = FB_{max} / (\dot{m}_{W,\,Soll,\,0} - \dot{m}_{W,\,Ist,\,0})$$

---

$$i = 0$$

---

$t_{Rest,\,i} > \Delta t$:  yes  |  no

TRIP !

50

$$i = i + 1$$
$$(\dot{m}_{W,\,Soll} - \dot{m}_{W,\,Ist})_i = (\dot{m}_{W,\,Soll} - \dot{m}_{W,\,Ist})$$
$$t_{Rest,\,i} = (\dot{m}_{W,\,Soll} - \dot{m}_{W,\,Ist})_{i-1} \cdot t_{Rest,\,i-1} \div$$
$$0.5 \div ((\dot{m}_{W,\,Soll} - \dot{m}_{W,\,Ist})_{i-1} + (\dot{m}_{W,\,Soll} - \dot{m}_{W,\,Ist})_i) \cdot \Delta t / (\dot{m}_{W,\,Soll} - \dot{m}_{W,\,Ist})_i$$

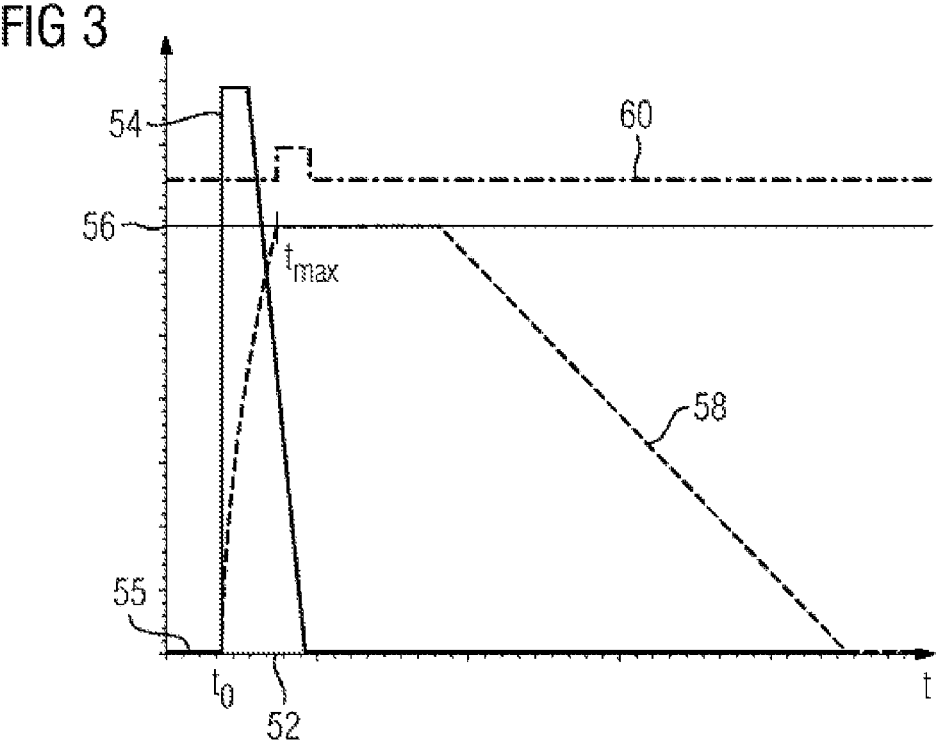
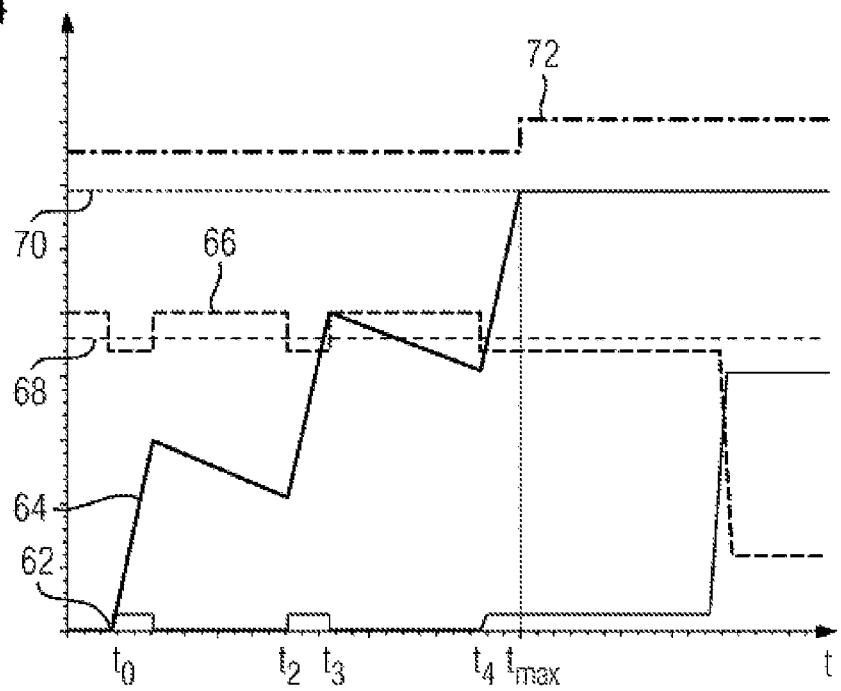

METHOD FOR REGULATING A VALVE

CROSS REFERENCE TO RELATED APPLICATIONS

This application is the US National Stage of International Application No. PCT/EP2011/052185, filed Feb. 15, 2011 and claims the benefit thereof. The International Application claims the benefits of European Patent Office application No. 10001533.8 EP filed Feb. 15, 2010. All of the applications are incorporated by reference herein in their entirety.

FIELD OF INVENTION

The invention relates to a method for regulating a valve, wherein the valve is arranged in a steam line, wherein the steam line has a device for spraying water.

BACKGROUND OF INVENTION

During starting or ramping up of a fossil-fired power plant, a boiler of the power plant, which is designed for producing steam, is initially operated at minimum load, which usually lies between 30% and 40% load. The live steam which is produced during this ramping-up phase is in this case customarily initially routed past the steam turbine directly to the condenser in so-called bypass mode. In the case of plants with a reheater, the live steam in this case is conducted via a high-pressure bypass station, spray-cooled to a low temperature level, and then directed into the cold line of the reheater. The steam which leaves the hot line of the reheater is conducted via an intermediate-pressure bypass station and cooled by means of spraying with water, and directed into the condenser. As a result of a high pressure level in the reheater, which customarily lies between about 20 bar and 30 bar, effective cooling of the reheater tubes, which are impinged upon by flue gas, is ensured.

For the operation of steam turbine plants, high demands are to be placed upon the purity of the steam. In particular, it is necessary to avoid particulate solids being entrained in the steam. Such solid body particles can lead to damage to the steam turbine and other plant components. Damage is incurred especially on the blading of the turbine.

In order to achieve slight superheating, it is necessary that the steam volume which is conducted via the intermediate-pressure bypass steam line is cooled to a low temperature level. This means that the bypass steam in the bypass steam line has to be spray-cooled with water. However, this requires a reliable and direct availability of the volume of water which is to be sprayed. Furthermore, a fast-acting spray water valve and a reliable measuring technique are required.

If the water which is to be sprayed is totally absent, precautions have to be taken so that no damage occurs. At present, the existing water spray protection devices are designed in such a way that only a total absence of spray water is taken into consideration.

Even temporarily falling short of the necessary volume of water is considered to be a malfunction, which in the worst case can lead to a total closing of the bypass steam line and could even lead to a trip, that is to say a shutdown of the entire power plant would be the consequence.

An initiated emergency shutdown of the bypass station can lead to repercussions upon the inspection interval or upon the service life of the gas turbine in the event of a gas turbine trip.

With the present precautions, it is quite possible that an emergency shutdown of the bypass station is carried out, even though a volume of water of more than 90% of the desired value has already been achieved and an emergency shutdown as such would not be necessary.

SUMMARY OF INVENTION

The invention comes in at this point, the object of which invention is to disclose a method for regulating a valve, with which method an emergency shutdown of the bypass station is executed in such a way that a premature closing of the valve is avoided.

This object is achieved by a method for regulating a valve according to the claims. In this case, the valve is arranged in a steam line, wherein the steam line has a device for spraying water, wherein an actual volume of water $\dot{m}_{W,IST}$ and a desired volume of water $\dot{m}_{W,SOLL}$ and a maximum water-volume deficiency $FB_{max}$ are determined, and a quotient $t_{Rest,0}$ between the maximum water volume deficiency $FB_{max}$ and the difference between the desired water volume $\dot{m}_{W,SOLL}$ and the actual volume of water $\dot{m}_{W,IST}$ is formed according to the equation $$t_{Rest,0} = \frac{FB_{max}}{\dot{m}_{W,SOLL} - \dot{m}_{W,IST}}$$

and the valve closes if $t_{Rest,0}$ is smaller than a value $\Delta t$.

The invention is based on the idea that the currently existing precautions allow an operation of the bypass station without sufficient volumes of spray water for a specific time $t_{max}$. The aforesaid precaution applies independently of the steam volume and the volume of spray water in the bypass station, i.e. that even for the maximum steam volume and totally absent volumes of spray water, the precautions are possible.

If a volume of spray water is absent as a result of a malfunction, this results in a lack of cooling. The lack of cooling is referred to as deficiency (FB) with regard to the enthalpy difference of the evaporating water and is produced by an integration of a deficient quantity over time, which is specified by the following equation: $\dot{m}_{W,SOLL} - \dot{m}_{W,IST}$. In this case, $\dot{m}_{W,SOLL}$ refers to the water flow rate and $\dot{m}_{W,IST}$ refers to the actual volumes of water.

The maximum permissible deficiency is produced by the following equation: $FB_{max} = \dot{m}_{W,max} \times t_{max,0}$, wherein $\dot{m}_{W,max}$ represents the maximum volume of spray water and $t_{max,0}$ represents the maximum time without water spraying. The deficiency which is accumulated until initiation of an emergency shutdown is calculated according to the following:

$$FB_{max} = \int_0^{t_{max}} (\dot{m}_{W,SOLL} - \dot{m}_{W,IST}) dt.$$

It is necessary that the maximum time allowed for reaching the maximum permissible deficiency is reached when the integrally determined deficiency is equal to the maximum permissible deficiency. This is achieved if the following equation is satisfied:

$$\int_0^{t_{max}} (\dot{m}_{W,SOLL} - \dot{m}_{W,IST}) dt = \dot{m}_{W,max} \times t_{max,0}.$$

If this equation is solved according to $t_{max,0}$, the maximum time allowed can be determined. However, in this case the precondition must be fulfilled that the determined volumes of water $m_{W,SOLL}$ and $m_{W,IST}$ are in compliance with the following equation:

$$\frac{m_{W,SOLL}}{m_{W,IST}} > 1,$$

which means that the actual volume of water is too low. According to the invention, the currently absent volume of spray water $m_{W,SOLL} - m_{W,IST}$ is calculated within specified time intervals $\Delta t$ and with the last accumulated deficiency is converted into a permissible residual time. If this calculated residual time falls below a cycle rate $\Delta t$, the valve is closed.

Advantageous developments are disclosed in the dependent claims.

In a first advantageous development, the maximum water-volume deficiency $FB_{max}$ is formed from a multiplication between a maximum volume of spray water and a maximum time according to the equation $FB_{max} = \dot{m}_{W,max} \times t_{max}$.

In a further advantageous development, the actual volume of water $\dot{m}_{W,IST}$ and the desired volume of water $\dot{m}_{W,SOLL}$ are determined according to each cycle rate $\Delta t$. This cycle rate can be optionally selected according to the invention, which leads to more accurate control than control with a longer cycle rate $\Delta t$.

According to an advantageous development, according to each cycle rate $\Delta t$ a residual time is determined and the valve is closed if the residual time $t_{Rest,i}$ is less than the value $\Delta t$, wherein i is to represent a counting of a loop, starting at zero, according to which the residual time $t_{Rest,i}$ is calculated in each case. This has the advantage that an integration is carried out, which integration leads to not just a criterion having to be fulfilled in order to achieve closing of the valve.

According to the invention, the residual time $t_{Rest,i}$ is determined according to the trapezoid rule.

BRIEF DESCRIPTION OF THE DRAWINGS

The invention is explained in more detail with reference to the schematic drawings. An exemplary embodiment of the invention is explained in more detail with reference to a drawing. In the drawing:

FIG. 2 shows a schematic representation of a flow diagram
FIGS. 3, 4 show graphic representations on the time base.

DETAILED DESCRIPTION OF INVENTION

Figure 1:
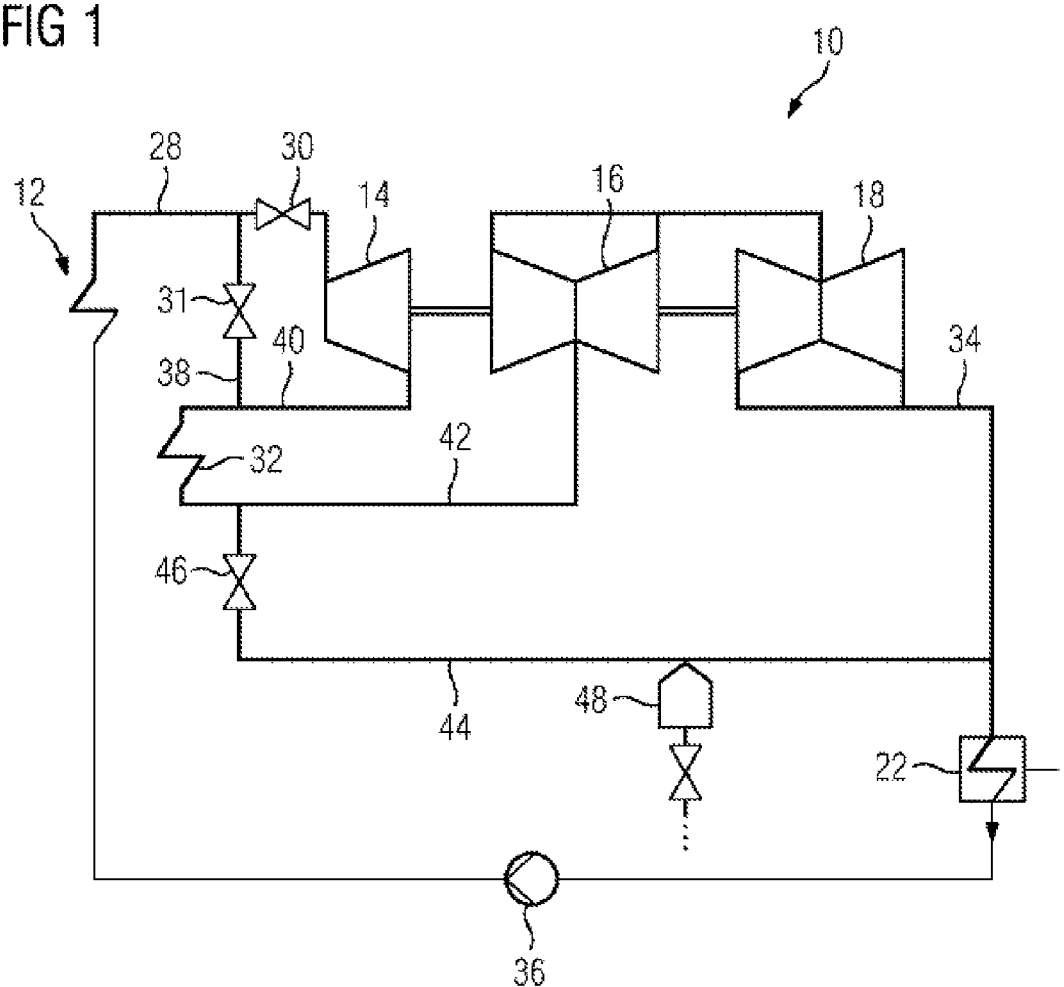
FIG. 1 shows a construction of a steam power plant.

FIG. 1 schematically shows the construction of a steam power plant 10 according to the invention. The steam power plant 10 comprises inter alia a boiler 12, a high-pressure turbine 14, an intermediate-pressure turbine 16, a low-pressure turbine 18, a generator which is not shown in more detail, a condenser 22 and a live steam line 28. Live steam which is produced in the boiler 12 is conducted via the live steam line 28 and via a live steam valve 30 to the high-pressure turbine section 14.

Downstream of the high-pressure turbine 14, the outflowing steam makes its way to a reheater 32 and from there into an intermediate-pressure turbine section 16. The outlet of the intermediate-pressure turbine section 16 is fluidically connected to an inlet of a low-pressure turbine section 18. The steam which discharges from the low-pressure turbine section 18 is fluidically connected via a low-pressure line 34 to the condenser 22.

In the condenser 22, the steam condenses, forming water, and via a pump 36 is directed again to the boiler 12, as a result of which a water-steam cycle is completed.

During starting or during shutting down of the steam power plant 10, the live steam is routed via a bypass line 38 past the high-pressure turbine 14 and conducted directly into the cold reheater line 40. The hot reheater line 42 which is constructed downstream of the reheater 32 is fluidically connected via an IP bypass station 44 to the condenser 22. Formed in this IP bypass station 44 are an IP bypass valve 46 and a device 48 for spraying water into the IP bypass station 44.

During starting or ramping up of the steam power plant 10, the boiler 12 is initially operated at minimum load (in most cases 30% to 40% load), wherein the steam which is produced is customarily initially routed past the high-pressure turbine 14 (bypass mode). The bypass mode is realized in this case by closing the emergency stop valve 31 which is arranged in the steam inflow section of the high-pressure turbine 14, wherein the live steam is conducted via a high-pressure bypass station 38 or bypass line 38, spray-cooled to a lower temperature level and then fed to a reheater 32, in fact initially to the cold line 40 of the reheater. The steam which leaves the hot line 42 of the reheater is conducted via an intermediate-pressure bypass station 44 and after cooling by means of sprayed water is directed into the condenser 22. As a result of a high pressure level in the reheater 32, effective cooling of the reheater tubes, which are impinged upon by flue gas, is ensured in the process.

The controlling of the valve 46 is carried out as described in the following: Initially, a cycle rate $\Delta t$ in seconds is predetermined or preset and a maximum permissible deficiency $FB_{max}$ (in kilograms) is also calculated, which deficiency can be determined in a first approximation by the following equation:

$$FB_{max} = \dot{m}_{W,max} \times t_{max,0}.$$

In a subsequent step, as shown in FIG. 2, a time $t_0$ equal to 0 is set if the condition of $\dot{m}_{W,IST}$ being less than $\dot{m}_{W,SOLL}$ is fulfilled. This means that as soon as the required volume of water in the device 48, which is conducted into the IP bypass station 44, is less than the desired volume of water, an integration begins. Initially, a volume of water is determined from a characteristic curve. Then, via a measurement, the actual volume of water is determined. A calculation of the residual time $$t_{Rest,0} = \frac{FB_{max}}{\dot{m}_{W,SOLL,0} - \dot{m}_{W,IST,0}}$$

is then carried out.

For further integration, the number variable i is set to zero. It is then determined whether the residual time is greater than the cycle rate. If the residual time is greater than the cycle rate, this case with "yes" is led to a further calculation loop, as shown in FIG. 2. This means that the index i is increased by 1 and a residual time is recalculated according to the trapezoid rule. To this end, the formula which is presented in the box 50 is used.

FIGS. 3 and 4 show different characteristic curves of the individual variables.

FIG. 3 shows the characteristic curve of the desired value 54 and the maximum deficiency $FB_{max}$ 56 on a time scale 52.

For the time t less than $t_0$, no spray water is available, which means that in the time period up to $t_0$ the absence of spray water 55 prevails. After the time point $t_0$, the integration begins, which is represented by the curve 58 and leads to an emergency shutdown at time point $t_{max}$. The initiation of the bypass emergency shutdown is represented by the curve 60. FIG. 3 represents the situation that there is 100% deficiency of the volume of water. This means, for example, that the valve remains in the "closed" position despite demand.

FIG. 4 shows a repetitive absence of spray water within a short time interval. At the time point $t_0$, the start of the integration 62 begins. The integrator 64 initially starts steeply and then runs back. During this time, the actual value 66 lies above the desired value. This means that during this time an emergency shutdown is not necessary. As soon as the actual value at the time point $t_2$ drops below the desired value again, the integration is continued, which is represented by the linear rise of the integrator 64. If the actual value at the time point $t_3$ is again greater than the desired value, the integrator runs back again, which is represented by the stepped line. At the time point $t_4$, the actual value is again below the desired value, which again leads to a rise of the integrator. However, the integrator rises to the value $FB_{max}$ 70, which leads to an emergency shutdown 72 being executed at the time point $t_{max}$.

The invention claimed is:

1. A method for regulating a valve, comprising:

arranging the valve in a steam line of a bypass station wherein the steam line has a device for spraying water into the bypass station;

determining an actual volume of water $\dot{m}_{W,IST}$, a desired volume of water $\dot{m}_{W,SOLL}$ and a maximum water-volume deficiency FBmax;

forming a quotient, $t_{Rest,0}$ between the maximum water-volume deficiency $FB_{max}$ and the difference of the desired volume of water $\dot{m}_{W,SOLL}$ and the actual volume of water $\dot{m}_{W,IST}$ according to the equation;

$$t_{Rest,0} = \frac{FB_{max}}{\dot{m}_{W,SOLL} - \dot{m}_{W,IST}}$$

and closing the valve when $t_{Rest,0}$ is smaller than a value $\Delta t$ wherein the maximum water-volume deficiency $FB_{max}$ is formed from a multiplication between a maximum volume of spray water $\dot{m}_{W,max}$ and a maximum time without water spraying $t_{max,0}$ according to the equation $FB_{max} = \dot{m}_{W,max} \times t_{max,0}$.

2. The method as claimed in claim 1, wherein the value $\Delta t$ is a cycle rate and the actual volume of water $\dot{m}_{W,IST}$ and the desired volume of water $\dot{m}_{W,SOLL}$ are determined according to each cycle rate $\Delta t$.

3. The method as claimed in claim 2, wherein according to each cycle rate $\Delta t$, a residual time $t_{Rest,i}$ is determined and the valve closes when the residual time $t_{Rest,i}$ is less than the value $\Delta t$, and wherein i represents a counting of a loop, starting at zero, according to which the residual time $t_{Rest,i}$ is calculated in each case.

4. The method as claimed in claim 3, wherein the residual time $t_{Rest,i}$ is determined according to a loop according to the following formula:

$$t_{Rest,i} = ((\dot{m}_{W,SOLL} - \dot{m}\dot{m}_{W,IST})_{i-1} \times t_{REST,i-1} - 0.5 \times ((\dot{m}_{W,SOLL} - \dot{m}_{W,SOLL} - \dot{m}_{W,IST})_i) \times \Delta t)/(\dot{m}_{W,SOLL} - \dot{m}_{W,IST})_i.$$

5. The method as claimed in claim 3, wherein the residual time $t_{Rest,i}$ is determined according to the trapezoid rule.

6. The method as claimed in claim 1, wherein the water which is sprayed into the steam line is provided for cooling steam which flows in the steam line.

7. The method as claimed in claim 1, wherein the maximum deficiency $FB_{max}$ represents a deficient maximum volume of water which is sprayed into the steam line for cooling and is determined according to the following equation:

$$FB_{max} = \dot{m}_{W,max} \times t_{max,0},$$

wherein $\dot{m}_{W,max}$ represents a maximum volume of sprayed water and $t_{max,0}$ represents a maximum time without water spraying.

* * * * *